(12) United States Patent
Komatsu et al.

(10) Patent No.: US 8,451,520 B2
(45) Date of Patent: May 28, 2013

(54) IMAGE FORMING APPARATUS FOR PERFORMING CALIBRATION VIA ADJUSTMENT CHARTS

(75) Inventors: Yasuo Komatsu, Saitama (JP); Seiji Shiraki, Saitama (JP); Kiyoshi Une, Saitama (JP); Takumi Nishikata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 931 days.

(21) Appl. No.: 12/556,131

(22) Filed: Sep. 9, 2009

(65) Prior Publication Data
US 2010/0177367 A1 Jul. 15, 2010

(30) Foreign Application Priority Data
Jan. 13, 2009 (JP) ................................. 2009-004629

(51) Int. Cl.
*G03F 3/08* (2006.01)
(52) U.S. Cl.
USPC ......................................................... 358/518
(58) Field of Classification Search
USPC .......................................... 358/1.9, 518, 527
See application file for complete search history.

(56) References Cited

U.S. PATENT DOCUMENTS
2009/0180688 A1* 7/2009 Sumi ............................. 382/167

FOREIGN PATENT DOCUMENTS
JP   A 10-322562   12/1998
JP   A 2002-232730   8/2002

* cited by examiner

*Primary Examiner* — Jeremiah Bryar
(74) *Attorney, Agent, or Firm* — Oliff & Berridge, PLC

(57) ABSTRACT

An image forming apparatus includes a chart data generating unit that generates density adjustment chart data; a printing unit that prints a density adjustment chart where the reference patterns and the adjustment patterns of each pattern are juxtaposed, based on the density adjustment chart data; a receiving unit that receives the input of a density adjustment value of an arbitrary pattern; a gradation correcting unit that corrects gradation of the arbitrary pattern based on the density adjustment value of the arbitrary pattern that is received by the receiving unit; and a reconstructing unit that reconstructs density adjustment chart data used to juxtapose and print the reference patterns and density-corrected adjustment patterns for only pattern data of the patterns where the receiving unit receives the density adjustment value.

9 Claims, 12 Drawing Sheets

FIG. 6

| (C, M, Y, K) | REFERENCE PATTERN (FEW-LINE PATTERN) | ADJUSTMENT PATTERN 1 | ADJUSTMENT PATTERN 2 | ADJUSTMENT PATTERN 3 | ADJUSTMENT PATTERN 4 | ADJUSTMENT PATTERN 5 |
|---|---|---|---|---|---|---|
| CYAN-H | (254,*,*,*) | (156,*,*,*) | (153,*,*,*) | (150,*,*,*) | (147,*,*,*) | (144,*,*,*) |
| CYAN-M | (253,*,*,*) | (102,*,*,*) | (99,*,*,*) | (96,*,*,*) | (93,*,*,*) | (90,*,*,*) |
| CYAN-L | (252,*,*,*) | (70,*,*,*) | (67,*,*,*) | (64,*,*,*) | (61,*,*,*) | (58,*,*,*) |
| MAGENTA-H | (*,254,*,*) | (*,156,*,*) | (*,153,*,*) | (*,150,*,*) | (*,147,*,*) | (*,144,*,*) |
| MAGENTA-M | (*,253,*,*) | (*,102,*,*) | (*,99,*,*) | (*,96,*,*) | (*,93,*,*) | (*,90,*,*) |
| MAGENTA-L | (*,252,*,*) | (*,70,*,*) | (*,67,*,*) | (*,64,*,*) | (*,61,*,*) | (*,58,*,*) |
| YELLOW-H | (*,*,254,*) | (*,*,156,*) | (*,*,153,*) | (*,*,150,*) | (*,*,147,*) | (*,*,144,*) |
| YELLOW-M | (*,*,253,*) | (*,*,102,*) | (*,*,99,*) | (*,*,96,*) | (*,*,93,*) | (*,*,90,*) |
| YELLOW-L | (*,*,252,*) | (*,*,70,*) | (*,*,67,*) | (*,*,64,*) | (*,*,61,*) | (*,*,58,*) |
| BLACK-H | (*,*,*,254) | (*,*,*,156) | (*,*,*,153) | (*,*,*,150) | (*,*,*,147) | (*,*,*,144) |
| BLACK-M | (*,*,*,253) | (*,*,*,102) | (*,*,*,99) | (*,*,*,96) | (*,*,*,93) | (*,*,*,90) |
| BLACK-L | (*,*,*,252) | (*,*,*,70) | (*,*,*,67) | (*,*,*,64) | (*,*,*,61) | (*,*,*,58) |

FIG. 7B

| 255 | 255 | 255 | 254 | 253 | 252 | 252 | 253 | 254 | 255 | 255 | 255 |
|---|---|---|---|---|---|---|---|---|---|---|---|
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |
| 255 | 255 | 255 | 254 | 253 | 252 | 252 | 253 | 254 | 255 | 255 | 255 |

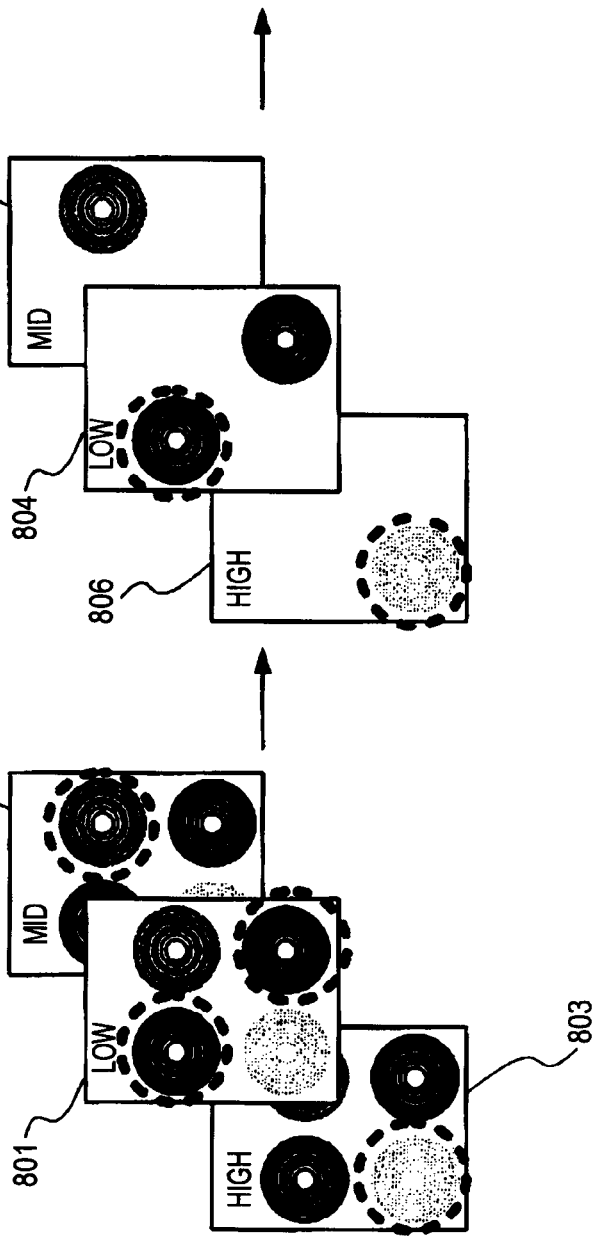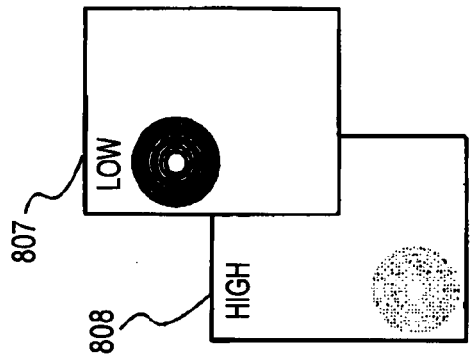

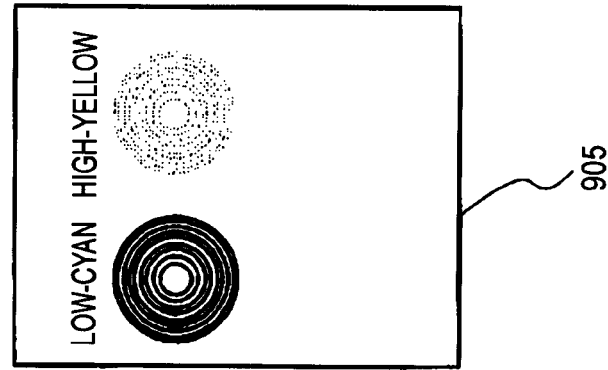
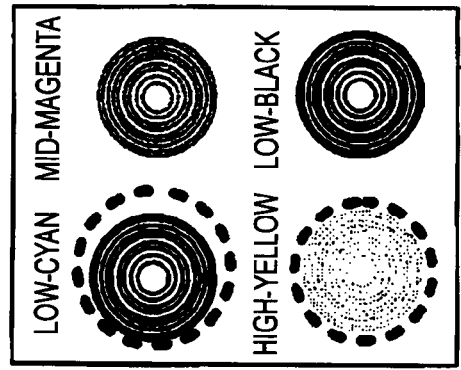
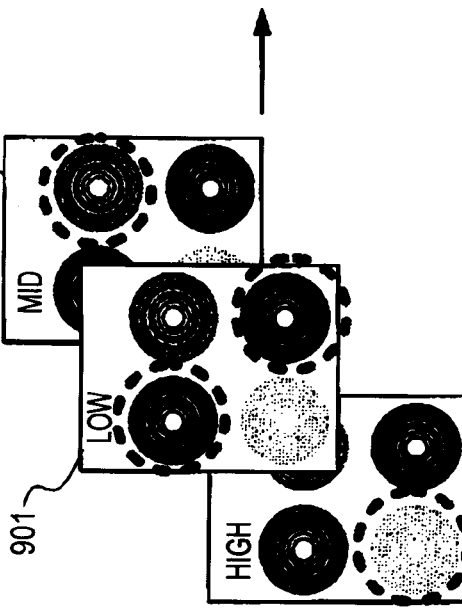

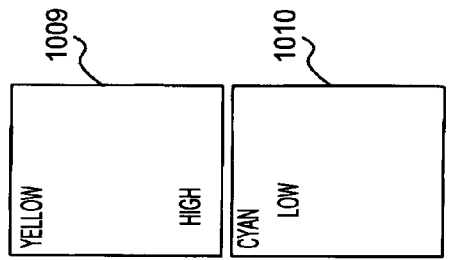
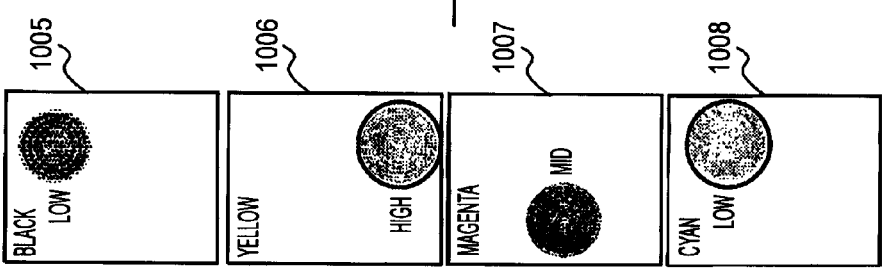
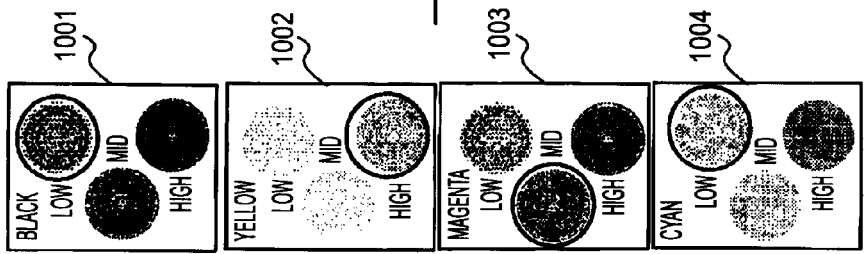

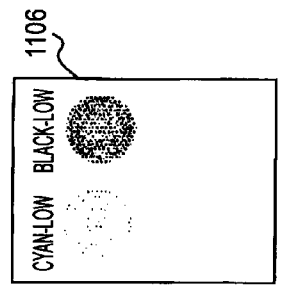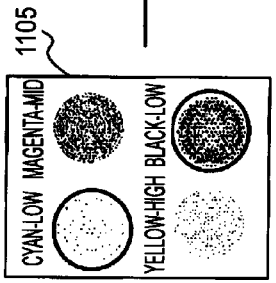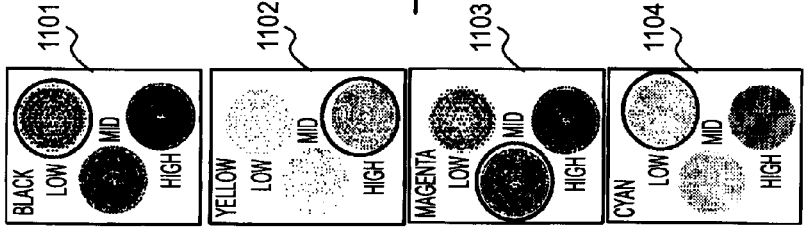

8,451,520 B2

IMAGE FORMING APPARATUS FOR PERFORMING CALIBRATION VIA ADJUSTMENT CHARTS

CROSS-REFERENCE TO RELATED APPLICATIONS

This application is based on and claims priority under 35 USC 119 from Japanese Patent Application No. 2009-004629 filed on Jan. 13, 2009.

BACKGROUND

1. Technical Field

An aspect of the present invention relates to an image forming apparatus.

2. Related Art

In an image forming apparatus, such as a printer or a copier, an image quality of a printed image might different from an operator's intent due to the aging degradation of each component.

In this case, calibration is performed for adjusting gray density, color reproducibility and the like.

For the calibration, an adjustment chart is printed from the image forming apparatus to be adjusted.

SUMMARY

According to an aspect of the present invention, there is provided an image forming apparatus including: a chart data generating unit that generates density adjustment chart data used to juxtapose and print reference patterns and adjustment patterns; a printing unit that prints a density adjustment chart where the reference patterns and the adjustment patterns of each pattern are juxtaposed, based on the density adjustment chart data; a receiving unit that receives the input of a density adjustment value of an arbitrary pattern based on the comparison of the contrasting density between the reference patterns and the adjustment patterns of the printed density adjustment chart performed by the visual recognition of the user; a gradation correcting unit that corrects gradation of the arbitrary pattern based on the density adjustment value of the arbitrary pattern that is received by the receiving unit; and a reconstructing unit that reconstructs density adjustment chart data used to juxtapose and print the reference patterns and density-corrected adjustment patterns for only pattern data of the patterns where the receiving unit receives the density adjustment value, wherein the densities of all patterns are corrected by performing: printing the density adjustment chart where the reference patterns and the adjustment patterns are juxtaposed for each of all kinds of the patterns based on a printing instruction of the density adjustment chart and proceeding to an adjustment step; receiving the input of the density adjustment value of an arbitrary pattern based on the comparison of the contrasting density between the reference patterns and the adjustment patterns of the printed density adjustment chart performed by the visual recognition of the user and printing the density adjustment chart where the reference patterns and the adjustment patterns of only the pattern corresponding to the input density adjustment value are juxtaposed, in the adjustment step; and repeatedly-receiving the user's input of the density adjustment value on the printed density adjustment chart.

BRIEF DESCRIPTION OF THE DRAWINGS

An exemplary embodiment of the invention will be described in detail based on the following figures, wherein:

FIG. 6 illustrates an example of a color arrangement combination for reference patterns and adjustment patterns in the adjustment chart;

FIGS. 7A to 7B illustrate processing performed by a few-line pattern processor 12;

FIGS. 8A to 8C illustrate adjustment charts printed on papers in an exemplary density adjustment flow;

FIGS. 9A to 9C illustrate adjustment charts printed on papers in another exemplary density adjustment flow;

FIGS. 10A to 10C illustrate adjustment charts printed on papers in still another exemplary density adjustment flow; and FIGS. 11A to 11C illustrate adjustment charts printed on papers in still another exemplary density adjustment flow.

DETAILED DESCRIPTION

An exemplary embodiment of the invention will be described in detail below with reference to accompanying drawings.

First, an image forming apparatus 1 will be described with reference to FIG. 1.

Figure 1:
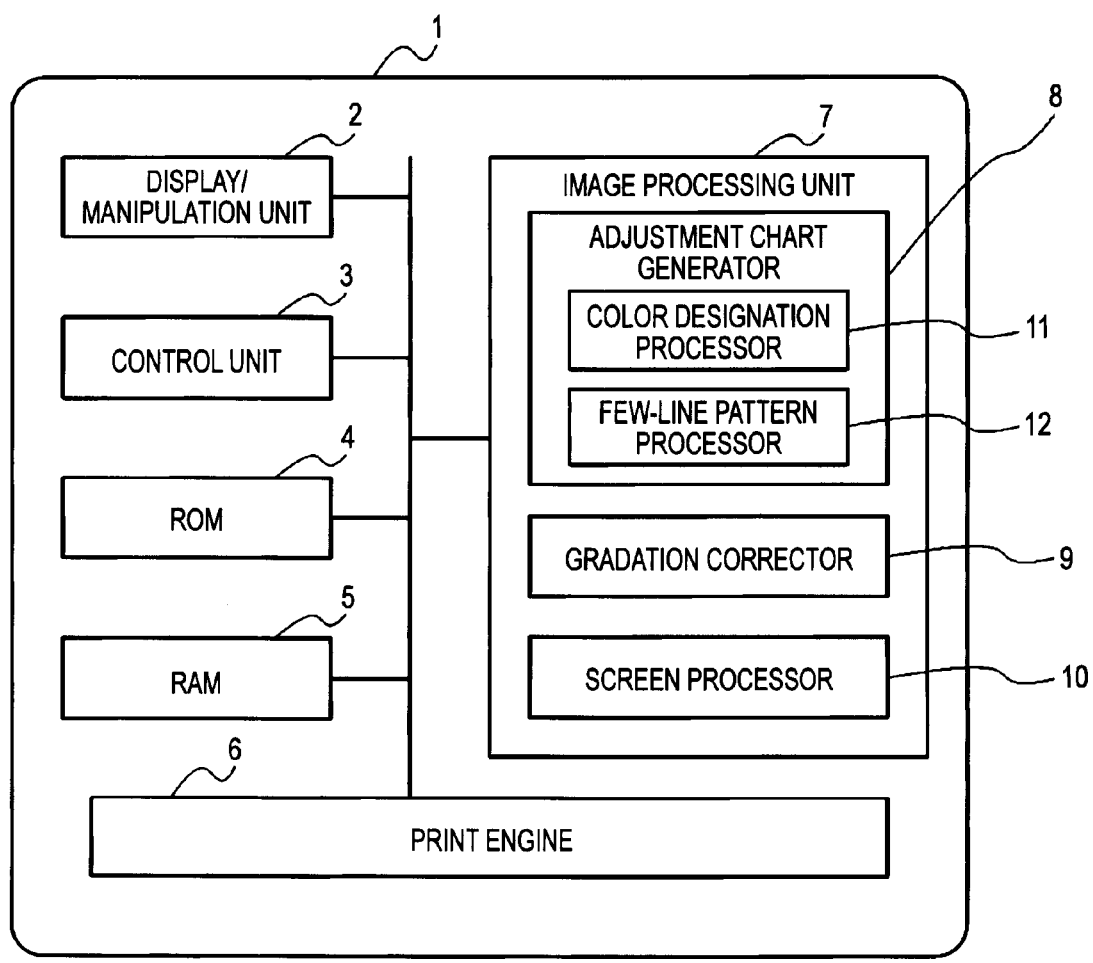
FIG. 1 illustrates a configuration of an image forming apparatus 1.

FIG. 1 illustrates an exemplary configuration of an image forming apparatus 1.

As shown in FIG. 1, the image forming apparatus 1 includes a display/manipulation unit 2, a control unit 3, a ROM (Read Only Memory) 4, a RAM (Random Access Memory) 5 and an image processing unit 7.

The display/manipulation unit 2 is a user interface, and is formed of a liquid crystal touch panel.

The control unit 3 is formed of a CPU (Central Processing Unit), and controls the image forming apparatus 1.

The ROM 4 stores firmware for operating the image forming apparatus 1 and an original chart that is data for printing an adjustment chart on a paper.

A print engine 6 includes a photosensitive member, a developing device, an exposure device and the like, and performs a process for printing image data on a paper.

The image processing unit 7 includes an adjustment chart generator 8 that generates an adjustment chart as image data, a gradation corrector 9 that performs the gamma correction on image data that is to be printed and a screen processor 10 that performs the halftone processing on the gamma-corrected image data.

The adjustment chart generator 8 generates an adjustment chart based on the original chart stored in the ROM 4.

The adjustment chart includes at least one of a plural-concentric-circles pattern. The plural-concentric-circles pattern includes reference patterns having a reference color and adjustment patterns having different colors.

Further, the adjustment chart generator 8 includes a color designation processor 11 and a few-line pattern processor 12.

The color designation processor 11 performs a color designation on the original chart that is stored in the ROM 4.

The few-line pattern processor 12 converts the reference pattern of the color-designated original chart into a few lines.

The few-line pattern processor 12 generates three kinds of reference patterns, that is, low, middle and high densities of the reference patterns.

The gradation corrector 9 performs the gamma correction on the image data to be printed, based on a stored LUT (LookUp Table).

The screen processor 10 performs halftone processing.

User is enabled to control an image forming apparatus 1 to print an adjustment chart for adjusting the gradation or gray balance of the image forming apparatus 1.

The adjustment chart includes one or plural plural-concentric-circles patterns.

Each plural-concentric-circles pattern includes reference patterns having a reference color and adjustment patterns having colors different from the reference color. The adjustment chart (plural-concentric-circles pattern) is used such that a user selects one of adjustment patterns, which has a color that seems to be the same (closest) to the reference color of the reference patterns, and inputs a value of the selected adjustment pattern to the image forming apparatus 1 as an adjustment value.

The gray balance or gradation is adjusted in the image forming apparatus 1 based on the input adjustment value.

The printed adjustment chart will be described below with reference to FIG. 2.

Figure 2:
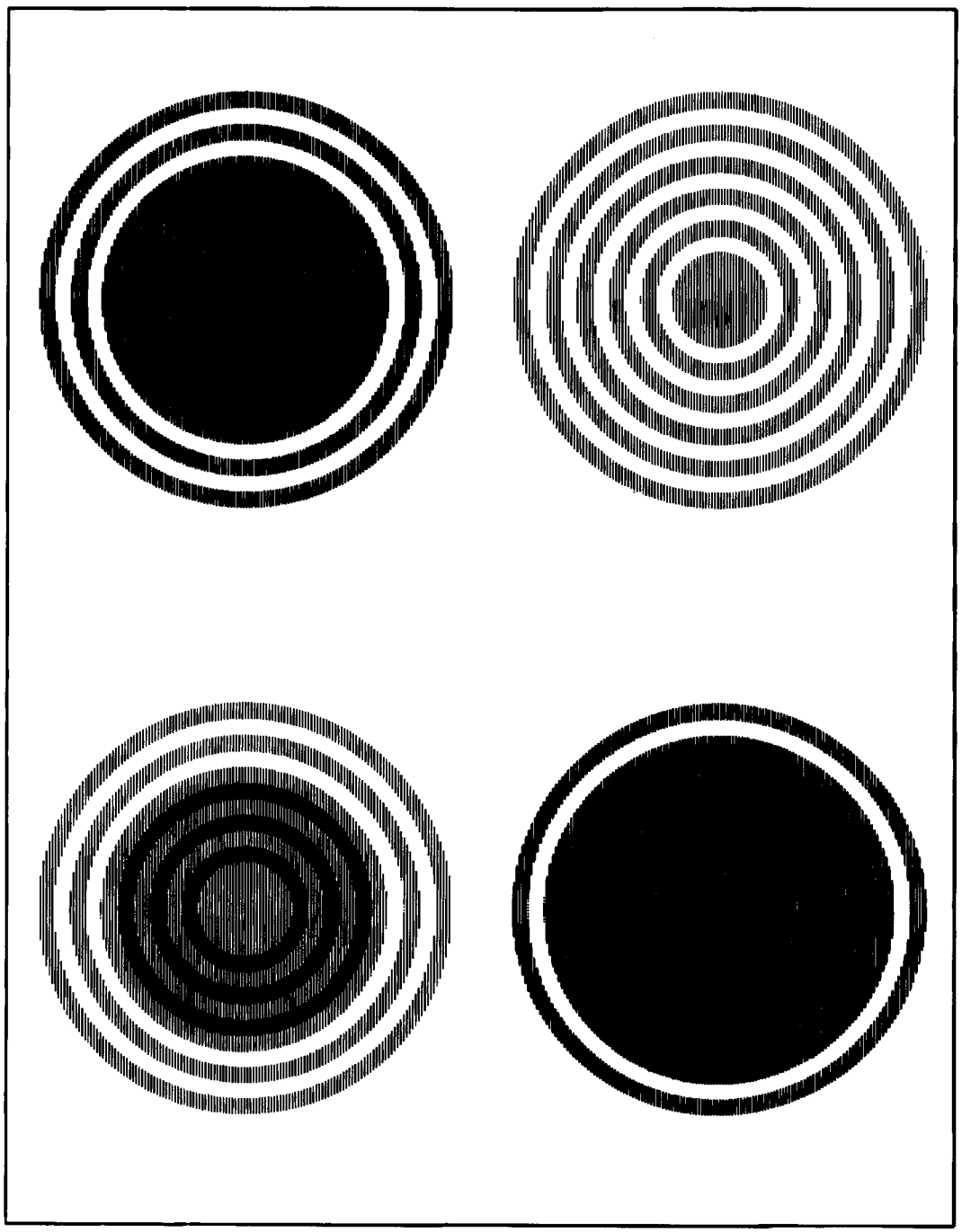
FIG. 2 illustrates an example of a printed adjustment chart.

FIG. 2 illustrates an example of the adjustment chart printed on a paper.

As shown in FIG. 2, the plural-concentric-circles patterns are disposed at upper left, upper right, lower left and lower right portions of the adjustment chart.

The plural-concentric-circles pattern will be described below with reference to FIG. 3.

Figure 3:
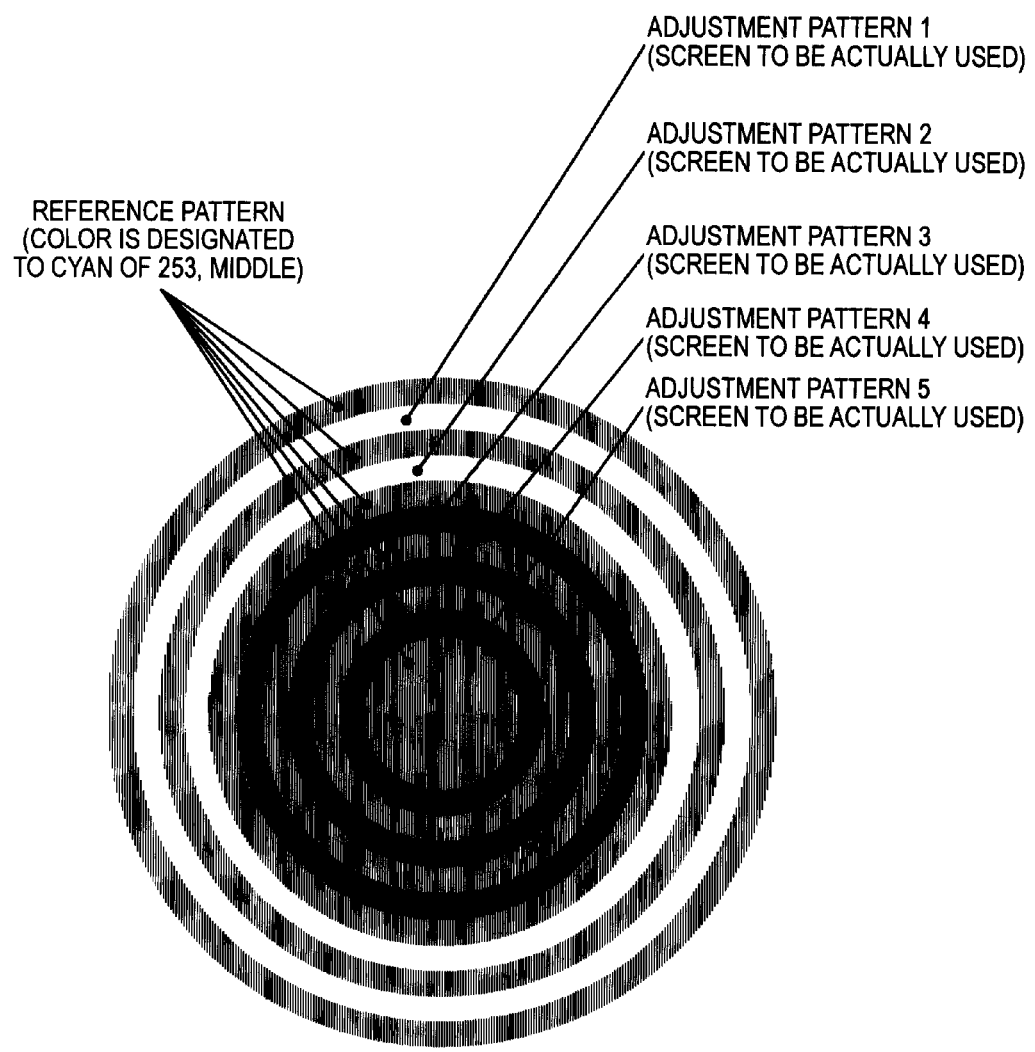
FIG. 3 illustrates a plural-concentric-circles pattern in the adjustment chart.

FIG. 3 illustrates a part of the adjustment chart shown in FIG. 2.

In the plural-concentric-circles pattern, as a part of the adjustment chart, the reference patterns and the adjustment patterns are alternately disposed adjacent to each other as shown in FIG. 3.

In this exemplary embodiment, the number of the adjustment patterns (plural-concentric-circles patterns) is 5. The reference numerals 1-5 are respectively assigned for the respective adjustment patterns.

The reference patterns are printed by a few-line screen so as to be resistant to the density variation in the image forming apparatus 1.

The adjustment patterns are printed by an actual screen, and the respective adjustment patterns are printed with different colors.

The original chart that is data for printing the adjustment chart will be described below with reference to FIG. 4.

Figure 4:
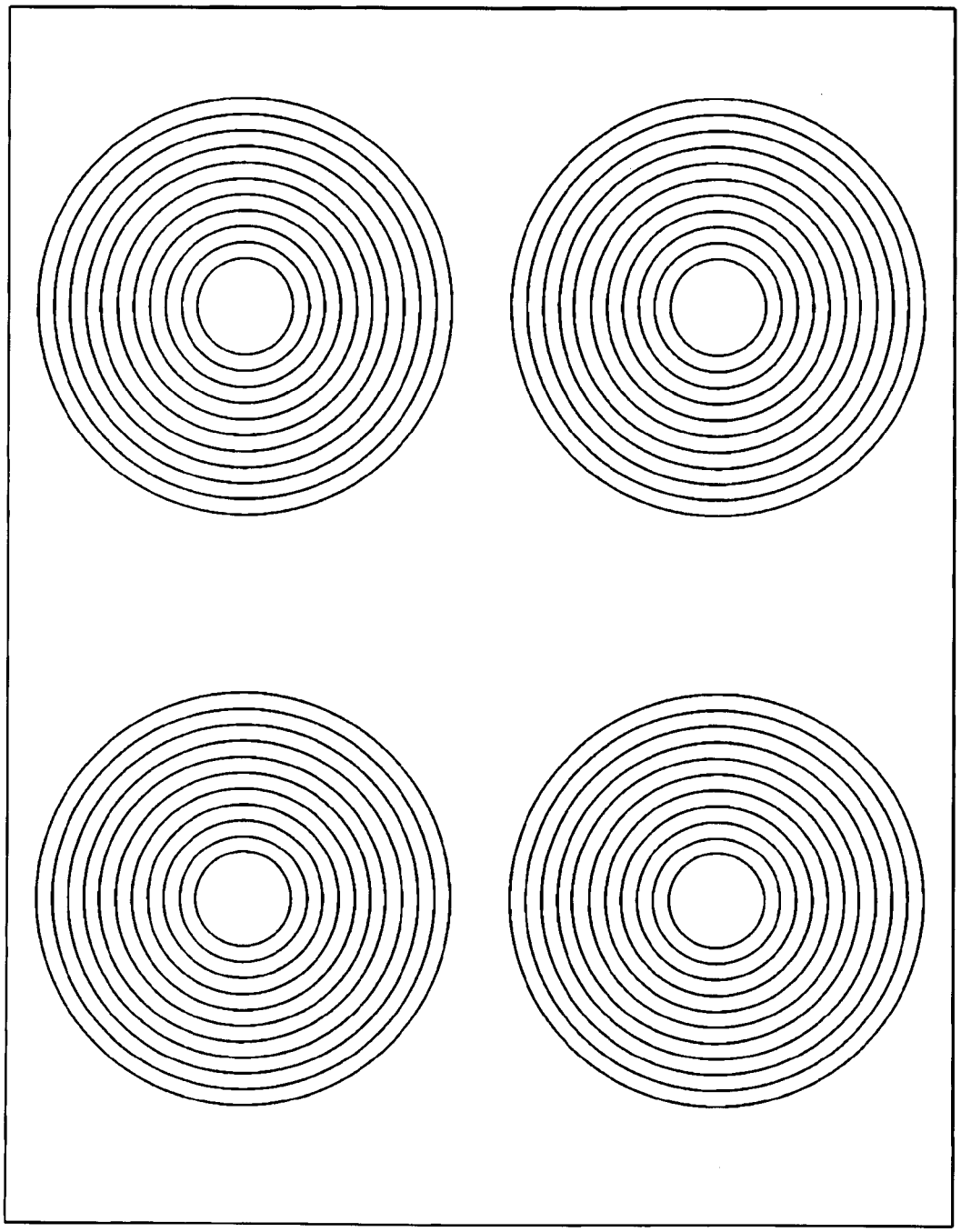
FIG. 4 illustrates image data of an original chart that is stored a ROM 4.

FIG. 4 illustrates image data of the original chart that is stored in the ROM 4.

As shown in FIG. 4, four plural-concentric-circles patterns are disposed at upper left, upper right, lower left and lower right portions of the original chart.

Each plural-concentric-circles pattern in the original chart will be described with reference to FIG. 5.

Figure 5:
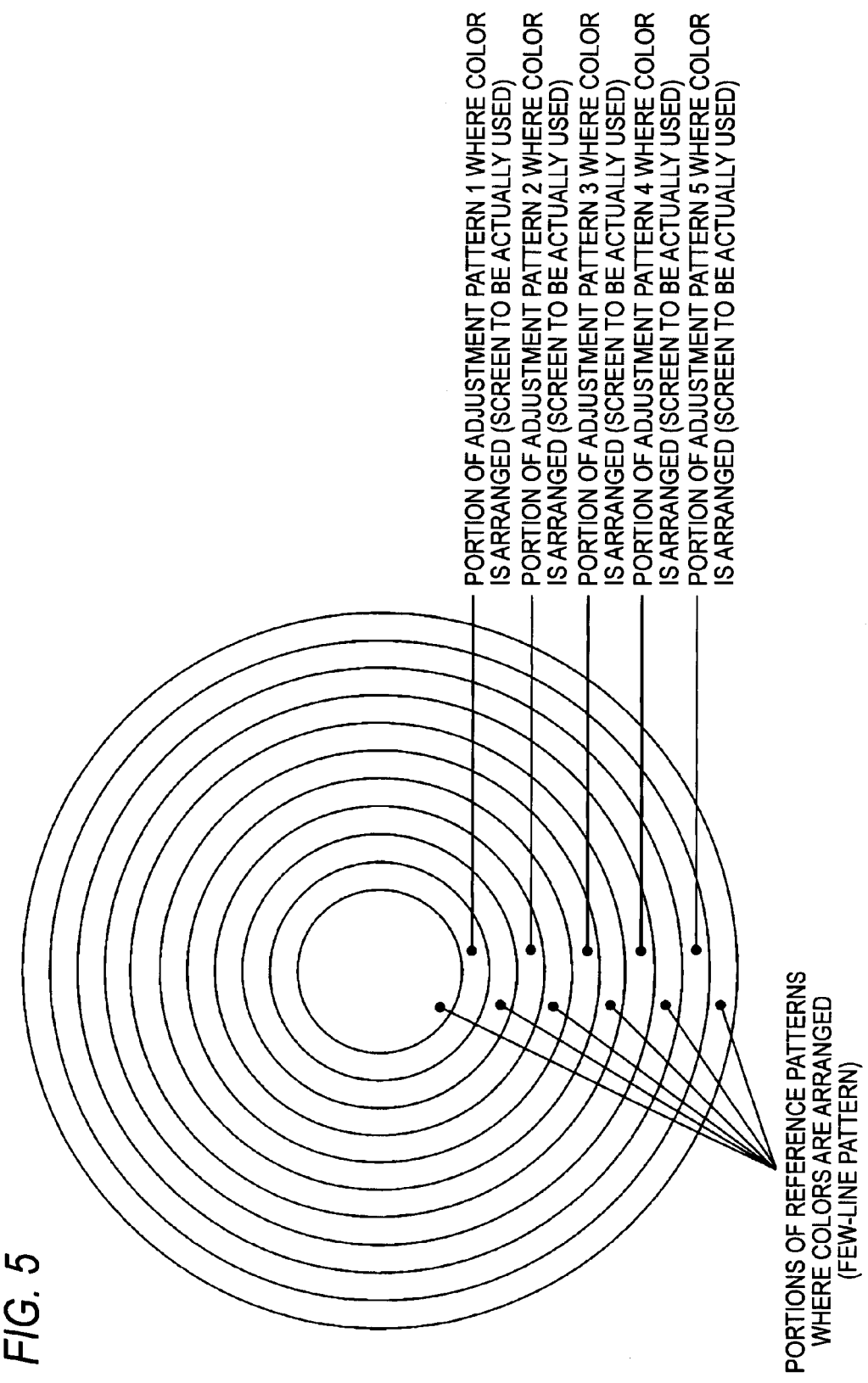
FIG. 5 illustrates a plural-concentric-circles pattern in the original chart.

FIG. 5 illustrates one plural-concentric-circles pattern in the image data of the original chart.

As shown in FIG. 5, each plural-concentric-circles pattern includes doughnut-shaped portions defined by contours of adjacent concentric circles in the plural-concentric-circles pattern.

In the plural-concentric-circles pattern, as shown in FIGS. 4 and 5, doughnut-shaped portions of the adjustment patterns are disposed between doughnut-shaped portions of the reference patterns.

In the plural-concentric-circles pattern, as shown in FIG. 5, the doughnut-shaped portions of the five reference patterns and the doughnut-shaped portions of the adjustment patterns 5-1 are alternately disposed from outer side, and the circle portion of the reference pattern is disposed thereinside.

On each of the doughnut-shaped portions and the circle portion, the color designation is performed.

Colors are arranged on the generated adjustment chart by designating given color combination on the each plural-concentric-circles pattern having the doughnut-shaped portions and the circle portion.

In FIG. 5, although borders between each of the doughnut-shaped portions and the circle portion are shown by circle lines for convenience of description, there is actually no line. If colors are not designated on a plural-concentric-circles pattern, nothing is printed at the portion corresponding thereto. For example, if colors are arranged only on the upper left and upper right plural-concentric-circles patterns among the four plural-concentric-circles patterns shown in FIG. 4, while the two plural-concentric-circles patterns are printed, nothing is printed at the lower left and lower right portions on the paper.

The color arrangement combination stored in the color designation processor 11 of the adjustment chart generator 8 will be described below with reference to FIG. 6.

FIG. 6 illustrates a table of the color arrangement combination stored in the color designation processor 11.

A process for arranging colors on the original chart is performed in the color designation processor 11.

A table of the color arrangement combinations related with positions is prepared, and the color arrangement on the adjustment patterns in the plural-concentric-circles pattern is performed based on the color arrangement combinations.

For example, for high density cyan, colors of the Cyan H (High) combination shown in FIG. 6 is arranged on the doughnut-shaped portions and the circle portion (reference patterns and adjustment patterns 1-5) in the original chart.

The processing of the few-line pattern processor 12 will be described below with reference to FIGS. 7A to 7B.

Figure 7A:
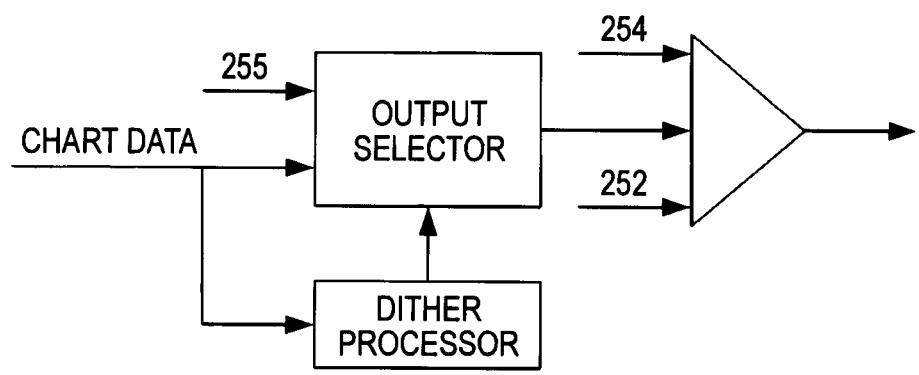

FIGS. 7A to 7B illustrate processing performed by the few-line pattern processor 12.

The original chart on which colors are arranged by the color designation processor 11 is processed by the few-line pattern processor 12.

The few-line pattern processor 12 converts the reference pattern into a few-line pattern by dither processing.

The few-line pattern processor 12 has a matrix and thresholds as shown in FIG. 7B. The few-line pattern processor outputs 255 as a pixel value that exceeds a threshold, and outputs other pixel values as it is. However, 252 to 254 are determined by a comparator that is provided at a rear end as shown in FIG. 7A, and are clipped to 0.

Due to this processing, in the color-arranged original chart, only the reference patterns are converted into vertical-few-line patterns while not changing the colors of the adjustment patterns.

If a pixel value of the reference color to be arranged to the reference pattern is 252, the two lines positioned in the middle of the matrix shown in FIG. 7B are changed into vertical-line patterns corresponding to 255, so that the reference patterns are changed into low density few-line patterns.

If a pixel value of the reference color is 253, the four lines positioned in the middle of the matrix shown in FIG. 7B are changed into vertical-line patterns corresponding to 255, so that the reference patterns are changed into middle density few-line patterns.

If a pixel value of the reference color is 254, the six lines positioned in the middle of the matrix shown in FIG. 7B are changed into vertical-line patterns corresponding to 255, so that the reference patterns are changed into high density few-line patterns.

Accordingly, if the density of the reference pattern is low, the color designation processor 11 arranges a color having a pixel value of 252 to the reference pattern. If the density of the reference pattern is middle, the color designation processor 11 arranges a color having a pixel value of 253 to the reference pattern. If the density of the reference pattern is high, the color designation processor 11 arranges a color having a pixel value of 254 to the reference pattern.

Further, the image data processed by the few-line pattern processor 12 is gamma corrected by the gradation corrector 9, is halftone processed by the screen processor 10, and is printed on the paper by the print engine 6.

A process for outputting adjustment charts corresponding to C (cyan), M (magenta), Y (yellow), and K (black) for three kinds of densities (low, middle, and high densities) and adjusting the densities of C, M, Y, and K will be described below with reference to FIGS. 8A to 8C.

FIGS. 8A to 8C show that adjustment charts corresponding to C (cyan), M (magenta), Y (yellow), and K (black) for three kinds of densities (low, middle, and high densities) are printed and output, and the output density of the image forming apparatus 1 is adjusted.

First, as shown in FIG. 8A, adjustment charts of C, M, Y and K with a low density, are printed on one paper (reference numeral 801).

In the low density adjustment chart (reference numeral 801), an adjustment chart of C (cyan) is disposed at an upper left portion, an adjustment chart of M (magenta) is disposed at an upper right portion, an adjustment chart of Y (yellow) is disposed at a lower left portion, and an adjustment chart of K (black) is disposed at a lower right portion.

In the middle density adjustment chart (reference numeral 802) and the high density adjustment chart (reference numeral 803), an adjustment chart of C (cyan) is disposed at an upper left portion, an adjustment chart of M (magenta) is disposed at an upper right portion, an adjustment chart of Y (yellow) is disposed at a lower left portion, and an adjustment chart of K (black) is disposed at a lower right portion.

After three low, middle and high density adjustment charts are printed, a user checks the adjustment charts. If the user determines low density C (cyan), low density K (black), middle density M (magenta) and high density Y (yellow) need to be adjusted, adjustment values therefor are input.

The adjustment value is input based on the adjustment pattern that seems to be a color closest to the reference color of the reference pattern.

After a density adjustment is performed in the image forming apparatus 1 based on the input adjustment value, new adjustment chart is printed for evaluation of a result of the density adjustment.

As the adjustment charts for evaluation, adjustment charts of respective C, M, Y and K and low, middle and high densities are not printed unlike the initially printed adjustment charts, and only the adjustment charts corresponding to the input adjustment values are printed.

That is, as shown in FIG. 8B, as the adjustment charts for the evaluation, low density C (cyan), and low density K (black) are printed on a low-density-printed paper (reference numeral 804); middle density M (magenta) is printed on a middle-density-printed paper (reference numeral 805); and high density Y (yellow) is printed on a high-density-printed paper (reference numeral 806).

Since only the adjustment charts corresponding to the input adjustment values are printed, the consumption of a color material is reduced.

After adjustment charts for evaluation are printed, the user checks the adjustment charts. If the user determines that some colors still need to be adjusted, adjustment values therefor are further input.

For example, if it is determined that low density C (cyan) and high density Y (yellow) need the density adjustment, adjustment values are input again to the image forming apparatus 1.

After an adjustment value of low density C (cyan) and an adjustment value of high density Y (yellow) are input to the image forming apparatus 1 and the density adjustment is performed in the image forming apparatus 1, new adjustment chart is printed again for evaluation of a result of the density adjustment.

In this case, the same adjustment charts as the previously printed adjustment charts are not printed, and only adjustment charts corresponding to the previously-input adjustment values are printed.

That is, as shown in FIG. 8C, low density C (cyan) is printed on the low-density-printed paper (reference numeral 807), and high density Y (yellow) is printed on the high-density-printed paper (reference numeral 808).

Even in an evaluation of the second density adjustment, since only the adjustment charts corresponding to the previously-input adjustment values are printed, the consumption of a color material is reduced.

Next, a process for outputting adjustment charts corresponding to C (cyan), M (magenta), Y (yellow), and K (black) for three kinds of densities (low, middle, and high densities) and adjusting the densities of C, M, Y, and K will be described below with reference to FIGS. 9A to 9C.

FIGS. 9A to 9C show that adjustment charts corresponding to C (cyan), M (magenta), Y (yellow), and K (black) for three kinds of densities (low, middle, and high densities) are printed and output, and the output density of the image forming apparatus 1 is adjusted. FIGS. 9A to 9C show the output that is different from the output of the adjustment chart described with reference to FIGS. 8A to 8C.

First, as shown in FIG. 9A, adjustment charts of C, M, Y and K for a low density are printed on one paper (reference numeral 901).

In the low density adjustment chart (reference numeral 901), an adjustment chart of C (cyan) is disposed at an upper left portion, an adjustment chart of M (magenta) is disposed at an upper right portion, an adjustment chart of Y (yellow) is disposed at a lower left portion, and an adjustment chart of K (black) is disposed at a lower right portion.

Likewise, even in the middle density adjustment chart (reference numeral 902) and the high density adjustment chart (reference numeral 903), an adjustment chart of C (cyan) is disposed at an upper left portion, an adjustment chart of M (magenta) is disposed at an upper right portion, an adjustment chart of Y (yellow) is disposed at a lower left portion, and an adjustment chart of K (black) is disposed at a lower right portion.

After three low, middle and high density adjustment charts are printed, a user checks the adjustment charts. If the user determines that low density C (cyan), low density K (black) having, middle density M (magenta) and high density Y (yellow) need to be adjusted, the adjustment values therefor are input.

The adjustment value is input based on the adjustment pattern that seems to be a color closest to the reference color of the reference pattern.

After a density adjustment is performed in the image forming apparatus 1 based on the input adjustment value, new adjustment chart is printed for evaluation of a result of the density adjustment.

As the adjustment charts for evaluation, adjustment charts of respective C, M, Y and K and low, middle and high densities are not printed unlike the initially printed adjustment charts, and only the adjustment charts corresponding to the input adjustment values are printed.

As the adjustment chart for evaluation, low, middle and high density colors are not printed respectively on adjustment charts are not respectively printed on papers for low, middle and high densities unlike the description with reference to FIGS. 8A to 8C, but low, middle and high density colors are printed so as to be included in the same paper.

That is, adjustment charts of low density C (cyan), low density K (black), middle density M (magenta) and high density Y (yellow) are printed together on one paper (reference numeral 904).

Since the adjustment charts corresponding to the input adjustment values are printed together on one paper as shown in FIG. 9B, the consumption of a color material is reduced. Further, since the low, middle and high density adjustment charts are not separately printed, the consumption of papers is also reduced.

After adjustment charts for evaluation are printed, the user checks the adjustment charts. If the user determines that some colors still need to be adjusted, adjustment values therefor are further input.

For example, if it is determined that low density C (cyan) and high density Y (yellow) need the density adjustment, adjustment values are input again to the image forming apparatus 1.

After an adjustment value of low density C (cyan) and an adjustment value of high density Y (yellow) are input to the image forming apparatus 1 and the density adjustment is performed in the image forming apparatus 1, new adjustment chart is printed again for evaluation of a result of the density adjustment.

The adjustment charts corresponding to the previously-input adjustment values are together printed on the same paper.

As shown in FIG. 9C, that is, the adjustment charts of low density C (cyan) and high density Y (yellow) are together printed on one paper (reference numeral 905).

Even in an evaluation of the second density adjustment, the low, middle and high density adjustment charts are together printed on the same paper, not on respective papers for low, middle and high densities.

A process for outputting adjustment charts corresponding to four colors of C (cyan), M (magenta), Y (yellow), and K (black) for low, middle, and high densities and adjusting the densities of C, M, Y, and K will be described below with reference to FIGS. 10A to 10C.

FIGS. 10A to 10C show a process for printing adjustment charts, which have low, middle, and high densities for each of four colors of C (cyan), M (magenta), Y (yellow), and K (black), on one paper sheet and adjusting the densities of C, M, Y, and K.

First, adjustment charts of K (black) for low, middle and high densities, are printed on one paper as shown in FIG. 10A (reference numeral 1001).

On the paper on which the adjustment charts of K (black) are printed, an adjustment chart (reference patterns and adjustment patterns) of low density K (black) is disposed at an upper right portion; an adjustment chart of middle density K (black) is disposed at a middle left portion; and an adjustment chart of high density K (black) is disposed at a lower right portion.

On the paper (reference numeral 1002) on which the adjustment charts of Y (yellow) are printed, an adjustment chart (reference patterns and adjustment patterns) of low density Y (yellow) is disposed at an upper right portion; an adjustment chart of middle density Y (yellow) is disposed at a middle left portion; and an adjustment chart of high density Y (yellow) is disposed at a lower right portion.

On the paper (reference numeral 1003) on which the adjustment charts of M (magenta) are printed, an adjustment chart (reference patterns and adjustment patterns) of low density M (magenta) is disposed at an upper right portion; an adjustment chart of middle density M (magenta) is disposed at a middle left portion; and an adjustment chart of high density M (magenta) is disposed at a lower right portion.

On the paper (reference numeral 1004) on which the adjustment charts of C (cyan) are printed, an adjustment chart (reference patterns and adjustment patterns) of low density C (cyan) is disposed at an upper right portion; an adjustment chart of middle density C (cyan) is disposed at a middle left portion; and an adjustment chart of high density C (cyan) is disposed at a lower right portion.

After the adjustment charts of C, M, Y and K are printed on four papers, a user checks the adjustment charts. If the user determines that low density C (cyan), low density K (black), middle density M (magenta) and high density Y (yellow) need to be adjusted, the adjusted values therefor are input.

The adjustment value is input based on the adjustment pattern that seems to be a color closest to the reference color of the reference pattern.

After a density adjustment is performed in the image forming apparatus 1 based on the input adjustment value, new adjustment chart is printed for evaluation of a result of the density adjustment.

As the adjustment charts for evaluation, adjustment charts of respective C, M, Y and K and low, middle and high densities are not printed unlike the initially printed adjustment charts, and only the adjustment charts corresponding to the input adjustment values are printed.

That is, as shown in FIG. 10B, as the adjustment charts for evaluation, low density K (black) is printed on a K-printed paper (reference numeral 1005), high density Y (yellow) is printed on a Y-printed paper (reference numeral 1006), middle density M (magenta) is printed on a M-printed paper (reference numeral 1007), and low density C (cyan) is printed on a C-printed paper (reference numeral 1008).

Since only adjustment charts corresponding to the input adjustment values are printed on the K-printed paper, the Y-printed paper the M-printed paper and the C-printed paper, the consumption of a color material is reduced.

After adjustment charts for evaluation are printed, the user checks the adjustment charts. If the user determines that some colors still need to be adjusted, adjustment values therefor are further input.

For example, if it is determined that high density Y (yellow) and middle density M (magenta) need the density adjustment, adjustment values are input again to the image forming apparatus 1.

After an adjustment value of high density Y (yellow) and an adjustment value of middle density M (magenta) are input to the image forming apparatus 1 and the density adjustment is performed in the image forming apparatus 1, new adjustment chart is printed again for evaluation of a result of the density adjustment.

In this case, the same adjustment charts as the previously printed adjustment charts are not printed, and only adjustment charts corresponding to the previously-input adjustment values are printed.

That is, as shown in FIG. 10C, high density Y (yellow) is printed on the Y-printed paper (reference numeral 1009), and low density C (cyan) is printed on the C-printed paper (reference numeral 1010).

Even in an evaluation of the second density adjustment, since only the adjustment charts corresponding to the previously-input adjustment values are printed, the consumption of a color material is reduced.

Next, a process for outputting adjustment charts corresponding to four colors of C (cyan), M (magenta), Y (yellow), and K (black) for low, middle, and high densities and adjusting the densities of C, M, Y, and K will be described below with reference to FIGS. 11A to 11C.

FIGS. 11A to 11C show a process for printing adjustment charts, which have low, middle, and high densities for each of four colors of C (cyan), M (magenta), Y (yellow), and K (black), on one paper sheet and adjusting the densities of C, M, Y, and K.

First, adjustment charts of K (black) for low, middle and high densities, are printed on one paper as shown in FIG. 11A (reference numeral 1101).

On the paper on which the adjustment charts of K (black) are printed, an adjustment chart (reference patterns and adjustment patterns) of low density K (black) is disposed at an upper right portion; an adjustment chart of middle density K (black) is disposed at a middle left portion; and an adjustment chart of high density K (black) is disposed at a lower right portion.

On the paper (reference numeral 1102) on which the adjustment charts of Y (yellow) are printed, an adjustment chart (reference patterns and adjustment patterns) of low density Y (yellow) is disposed at an upper right portion; an adjustment chart of middle density Y (yellow) is disposed at a middle left portion; and an adjustment chart of high density Y (yellow) is disposed at a lower right portion.

On the paper (reference numeral 1103) on which the adjustment charts of M (magenta) are printed, an adjustment chart (reference patterns and adjustment patterns) of low density M (magenta) is disposed at an upper right portion; an adjustment chart of middle density M (magenta) is disposed at a middle left portion; and an adjustment chart of high density M (magenta) is disposed at a lower right portion.

On the paper (reference numeral 1104) on which the adjustment charts of C (cyan) are printed, an adjustment chart (reference patterns and adjustment patterns) of low density C (cyan) is disposed at an upper right portion; an adjustment chart of middle density C (cyan) is disposed at a middle left portion; and an adjustment chart of high density C (cyan) is disposed at a lower right portion.

After the adjustment charts of C, M, Y and K are printed on four papers, a user checks the adjustment charts. If the user determines that low density C (cyan), low density K (black), middle density M (magenta) and high density Y (yellow) need to be adjusted, the adjustment values therefor are input.

The adjustment value is input based on the adjustment pattern that seems to be a color closest to the reference color of the reference pattern.

After a density adjustment is performed in the image forming apparatus 1 based on the input adjustment value, new adjustment chart is printed for evaluation of a result of the density adjustment.

As the adjustment charts for evaluation, adjustment charts for low, middle and high densities are not printed on the papers corresponding to respective C, M, Y and K unlike the initially printed adjustment charts, and only the adjustment charts corresponding to the input adjustment values are printed together on one paper.

That is, the adjustment charts of low density K (black), high density Y (yellow), middle density M (magenta) and low density C (cyan) are printed together on one paper (reference numeral 1105).

Since the adjustment charts corresponding to input adjustment values are together printed on one paper as shown in FIG. 11B, the consumption of a color material is reduced. Further, since the adjustment charts are not separately printed for each color, the consumption of papers is also reduced.

After adjustment charts for evaluation are printed, the user checks the adjustment charts. If the user determines that some colors still need to be adjusted, adjustment values therefor are further input.

For example, if it is determined that the adjustment charts of low density C (cyan) and high density K (black) need the density adjustment, adjustment values are input again to the image forming apparatus 1.

After an adjustment value of low density C (cyan) and an adjustment value of high density K (black) are input to the image forming apparatus 1 and the density adjustment is performed in the image forming apparatus 1, new adjustment chart is printed again for evaluation of a result of the density adjustment.

The adjustment charts corresponding to the previously-input adjustment values are together printed on the same paper.

That is, as shown in FIG. 11C, the adjustment charts of low density C (cyan) and high density K (black) are printed together on one paper (reference numeral 1106).

Even in an evaluation of the second density adjustment, the adjustment charts of K (black), Y (yellow), M (magenta) and C (Cyan) are together printed on the same paper, not on respective papers for K (black), Y (yellow), M (magenta) and C (Cyan).

As for the adjustment chart printed from the image forming apparatus 1, not only the adjustment chart for a density adjustment but also the adjustment chart for a gray balance adjustment may be generated by the adjustment chart generator 7 and may be printed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment is described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a chart data generating unit that generates density adjustment chart data used to juxtapose and print reference patterns and adjustment patterns;
   a printing unit that prints a density adjustment chart where the reference patterns and the adjustment patterns of each pattern are juxtaposed, based on the density adjustment chart data;
   a receiving unit that receives the input of a density adjustment value of an arbitrary pattern based on a comparison of the contrasting density between the reference patterns and the adjustment patterns of the printed density adjustment chart performed by the visual recognition of the user;

a gradation correcting unit that corrects gradation of the arbitrary pattern based on the density adjustment value of the arbitrary pattern that is received by the receiving unit; and a reconstructing unit that reconstructs density adjustment chart data used to juxtapose and print the reference patterns and density-corrected adjustment patterns for only pattern data of the patterns where the receiving unit receives the density adjustment value, wherein the densities of all patterns are corrected by performing:

printing the density adjustment chart where the reference patterns and the adjustment patterns are juxtaposed for each of all kinds of the patterns based on a printing instruction of the density adjustment chart and proceeding to an adjustment step;

receiving the input of the density adjustment value of an arbitrary pattern based on the comparison of the contrasting density between the reference patterns and the adjustment patterns of the printed density adjustment chart performed by the visual recognition of the user and printing the density adjustment chart where the reference patterns and the adjustment patterns of only the pattern corresponding to the input density adjustment value are juxtaposed, in the adjustment step; and repeatedly-receiving the user's input of the density adjustment value on the printed density adjustment chart.

2. The image forming apparatus according to claim 1, wherein the chart data generating unit generates chart data of pages corresponding to the density number where pattern data of one density of each color is disposed on one page, based on the printing instruction of the density adjustment chart, and wherein the reconstructing unit reconstructs chart data where pattern data of colors except for the color where the density adjustment value has been input are removed from a corresponding page, after the adjustment step.

3. The image forming apparatus according to claim 1, wherein the chart data generating unit generates chart data of pages corresponding to the density number where pattern data of one density of each color are disposed on one page, based on the printing instruction of the density adjustment chart, and wherein the reconstructing unit reconstructs chart data where pattern data of the pattern where the density adjustment value has been input are provided together on one page, after the adjustment step.

4. The image forming apparatus according to claim 1, wherein the chart data generating unit generates chart data of pages corresponding to the color number where pattern data of the density number of the same color are provided together on one page, based on the printing instruction of the density adjustment chart, and wherein the reconstructing unit reconstructs chart data where pattern data of densities except for the density where the density adjustment value has been input are removed from a corresponding page, after the adjustment step.

5. The image forming apparatus according to claim 1, wherein the chart data generating unit generates chart data of pages corresponding to the color number where pattern data of the density number of the same color are disposed on one page, based on the printing instruction of the density adjustment chart, and wherein the reconstructing unit reconstructs chart data where pattern data of the pattern where the density adjustment value has been input are together provided on one page, after the adjustment step.

6. The image forming apparatus according to claim 1, wherein the reconstructing unit reconstructs a printing position on the density adjustment chart of pattern data of the pattern where the density adjustment value has been input, after the adjustment step.

7. The image forming apparatus according to claim 1, further comprising:

a holding unit that holds one kind of pattern data used to juxtapose and print the reference patterns and the adjustment patterns, wherein the chart data generating unit receives color designation of the pattern data that is held by the holding unit, and generates density adjustment chart data that are used to juxtapose and print the reference patterns and density-corrected adjustment patterns corresponding to the designated color.

8. The image forming apparatus according to claim 1, wherein the density adjustment chart is used to adjust the density of a color.

9. The image forming apparatus according to claim 1, wherein the density adjustment chart is used to adjust gray balance.

* * * * *